(12) United States Patent
Farhoodfar et al.

(10) Patent No.: US 10,944,620 B2
(45) Date of Patent: *Mar. 9, 2021

(54) MULTIPLEXERS WITH PROTECTION SWITCHING

(71) Applicant: INPHI CORPORATION, Santa Clara, CA (US)

(72) Inventors: Arash Farhoodfar, Santa Clara, CA (US); Jitendra Swarnkar, Fremont, CA (US); Michael Duckering, Santa Clara, CA (US); Andre Sczapanek, Northhampton (GB); Scott Feller, Santa Clara, CA (US); Shaun Lytollis, Santa Clara, CA (US)

(73) Assignee: INPHI CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,114

(22) Filed: Jul. 15, 2020

(65) Prior Publication Data
US 2020/0351144 A1 Nov. 5, 2020

Related U.S. Application Data

(63) Continuation of application No. 16/775,130, filed on Jan. 28, 2020, now Pat. No. 10,749,732, which is a
(Continued)

(51) Int. Cl.
*H04L 29/08* (2006.01)
*G06F 11/20* (2006.01)
(Continued)

(52) U.S. Cl.
CPC .......... *H04L 29/08* (2013.01); *G06F 11/2007* (2013.01); *H04L 1/22* (2013.01);
(Continued)

(58) Field of Classification Search
CPC .... H03M 13/37; H04L 25/4908; H04L 29/08; H04L 12/40; H04L 41/12; H04L 12/427;
(Continued)

(56) References Cited

U.S. PATENT DOCUMENTS 10,069,660 B1 * 9/2018 Sun .................. H04L 1/0041
10,749,732 B2 * 8/2020 Farhoodfar .......... H04W 28/06

* cited by examiner

*Primary Examiner* — Rahel Guarino
(74) *Attorney, Agent, or Firm* — Richard T. Ogawa; Ogawa P.C.

(57) ABSTRACT

The present invention is directed to data communication. In certain embodiments, the present invention provides switching mechanism for choosing between redundant communication links. Data received from a first set of communication links are processed to have alignment markers removed, and first figure of merit value is determined based on the data without alignment markers. Similarly, a second figure of merit value is determined for the data received from the second set of communication links. A switch selects between the first set of communication links and the second set of communication links based on their respective figure of merit values. Alignment markers are inserted into the data transmitted through the selected set of data links. There are other embodiments as well.

19 Claims, 6 Drawing Sheets

Related U.S. Application Data continuation of application No. 16/232,821, filed on Dec. 26, 2018, now Pat. No. 10,587,452, which is a continuation of application No. 15/987,808, filed on May 23, 2018, now Pat. No. 10,205,625, which is a continuation of application No. 15/673,352, filed on Aug. 9, 2017, now Pat. No. 10,009,214.

(51) Int. Cl.
*H04L 12/427* (2006.01)
*H04L 1/22* (2006.01)
*H04L 12/24* (2006.01)
*H04L 12/40* (2006.01)
*H04W 28/06* (2009.01)
*H04W 28/04* (2009.01)
*H04L 12/26* (2006.01)

(52) U.S. Cl.
CPC ...... *H04L 12/40176* (2013.01); *H04L 12/427* (2013.01); *H04L 41/12* (2013.01); *H04L 43/0847* (2013.01); *H04W 28/04* (2013.01); *H04W 28/06* (2013.01)

(58) Field of Classification Search
CPC ... H04L 1/22; H04L 12/40176; H04L 49/352; H04L 43/0847; H04L 69/324; H04L 69/18; G06F 13/40; G06F 11/2007; Y02D 50/30; H04W 28/04; H04W 28/06
See application file for complete search history.

MULTIPLEXERS WITH PROTECTION SWITCHING

CROSS-REFERENCES TO RELATED APPLICATIONS

The present application is a continuation of and claims priority to U.S. application Ser. No. 16/775,130 filed Jan. 28, 2020, which is a continuation of and claims priority to U.S. application Ser. No. 16/232,821 filed Dec. 26, 2018 (now U.S. Pat. No. 10,587,452 issued Mar. 10, 2020), which is a continuation of and claims priority to U.S. application Ser. No. 15/987,808 filed May 23, 2018 (now U.S. Pat. No. 10,205,625 issued Feb. 12, 2019), which is a continuation of and claims priority to U.S. application Ser. No. 15/673,352 filed on Aug. 9, 2017 (now U.S. Pat. No. 10,009,214 issued Jun. 26, 2018), the contents of which are incorporated by reference herein in their entirety.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to data communication systems and techniques thereof.

Over the last few decades, the use of communication networks has exploded. In the early days of the Internet, popular applications were limited to emails, bulletin board, and mostly informational and text-based web page surfing, and the amount of data transferred was relatively small. Today, the Internet and mobile applications demand a huge amount of bandwidth for transferring photo, video, music, and other multimedia files. For example, a social network like Facebook processes more than 500 TB of data daily. With such high demands on data storage and data transfer, existing data communication systems need to be improved to address these needs.

For high-speed data communication applications, it is important to ensure system and link reliability. Over the past, various conventional techniques have been proposed and implemented, but unfortunately they have been inadequate. It is thus desirable to have new and improved systems and methods.

BRIEF SUMMARY OF THE INVENTION

The present invention is directed to data communication systems and techniques thereof. In certain embodiments, the present invention provides switching mechanism for choosing between redundant communication links. Data received from a first set of communication links are processed to have alignment markers removed, and a first figure of merit value is determined based on the data without alignment markers. Similarly, a second figure of merit value is determined for the data received from the second set of communication links. A switch selects between the first set of communication links and the second set of communication links based on their respective figure of merit values. Alignment markers are inserted into the data transmitted through the selected set of data links. There are other embodiments as well.

According to an embodiment, the present invention provides a communication device, which includes a first input port that is configured to receive a first plurality of data streams from a first plurality of data lanes. The first plurality of data lanes includes n data lanes, where n is greater than 1. The device also includes a second input port configured to receive a second plurality of data streams from a second plurality of data lanes. The device includes a first forward error correction (FEC) module that is configured to decode the first plurality of data streams. The device also includes a second FEC module that is configured to decode the second plurality of data streams. The device also includes a first alignment marker (AM) removing module that is configured to remove AMs from the first plurality of data streams to generate a third plurality of data streams. The device includes a second AM removing module that is configured to remove AMs from the second plurality of data streams to generate a fourth plurality of data streams. The device further includes a first monitoring module that is configured to determine a first coding error amount associated with the third plurality of data streams. The device additionally includes a second monitoring module that is configured to determine a second coding error amount associated with the fourth plurality of data streams. The device also includes a first figure of merit (FOM) module that is configured to calculate a first FOM value based the first coding error amount and/or output from the first FEC. The device also includes a second FOM module that is configured to calculate a second FOM value based on the second coding error amount and/or output from the second FEC. The device further includes a switch that is configured to output a fifth plurality of data streams selected between the third plurality of data streams and the fourth plurality of data streams based at least on the first FOM value and the second FOM value. The device also includes an AM insertion module that is configured to insert AMs into the fifth plurality of data streams.

According to another embodiment, the present invention provides a method for switching between data paths. The method includes receiving a first plurality of data streams from a first plurality of n data lanes. The method also includes receiving a second plurality of data streams from a second plurality of n data lanes. The method further includes performing FEC decoding on the first plurality of data streams. The method also includes performing FEC decoding on the second plurality of data streams. The method also includes generating a third plurality of data streams by removing AMs from the first plurality of data streams. The method additionally includes generating a fourth plurality of data streams by removing AMs from the second plurality of data streams. The method additionally includes determining a first FOM value for the third plurality of data streams. The method further includes determining a second FOM value for the fourth plurality of data streams. The method also includes generating a fifth plurality of data streams by selecting between the third plurality of data streams and the fourth plurality of data streams based on at least the first FOM value and the second FOM value. The method also includes generating a sixth plurality of data streams by inserting AMs into the fifth plurality of data streams.

According to yet another embodiment, the present invention provides a SerDes system. The system includes a first SerDes device that has a first plurality of data lanes and a second plurality of data lanes. The system includes a first input port that is configured to receive a first plurality of data streams from the first plurality of data lanes. The first plurality of data lanes includes n data lanes, where n is greater than 1. The system also includes a second input port configured to receive a second plurality of data streams from the second plurality of data lanes. The system additionally includes a first alignment marker (AM) removing module that is configured to remove AMs from the first plurality of data streams to generate a third plurality of data streams. The system further includes a second AM removing module that is configured to remove AMs from the second plurality of data streams to generate a fourth plurality of data streams. The system additionally includes a first monitoring module that is configured to determine a first coding error amount associated with the third plurality of data streams. The system also includes a second monitoring module that is configured to determine a second coding error amount associated with the fourth plurality of data streams. The system further includes a first figure of merit (FOM) module that is configured to calculate a first FOM value based at least on the first coding error amount. The system additionally includes a second FOM module that is configured to calculate a second FOM value based at least on the second coding error amount. The system further includes a switch that is configured to output a fifth plurality of data streams selected between the third plurality of data streams and the fourth plurality of data streams based at least on the first FOM value and the second FOM value. The system also includes an AM insertion module that is configured to insert AMs into the fifth plurality of data streams.

It is to be appreciated that embodiments of the present invention provide many advantages over conventional techniques. Among other things, by utilizing redundant communication links for data transmission, reliability is improvement for communication systems. When the quality of a set of communication links is poor, data transmission can be smoothly switched to another of communication links without causing disruption.

Embodiments of the present invention can be implemented in conjunction with existing systems and processes. For example, switching between communication links and calculating FOM values can be implemented using existing manufacturing processes. Additionally, hitless switching mechanisms according to embodiments of the present invention can be readily adopted into existing communication systems. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
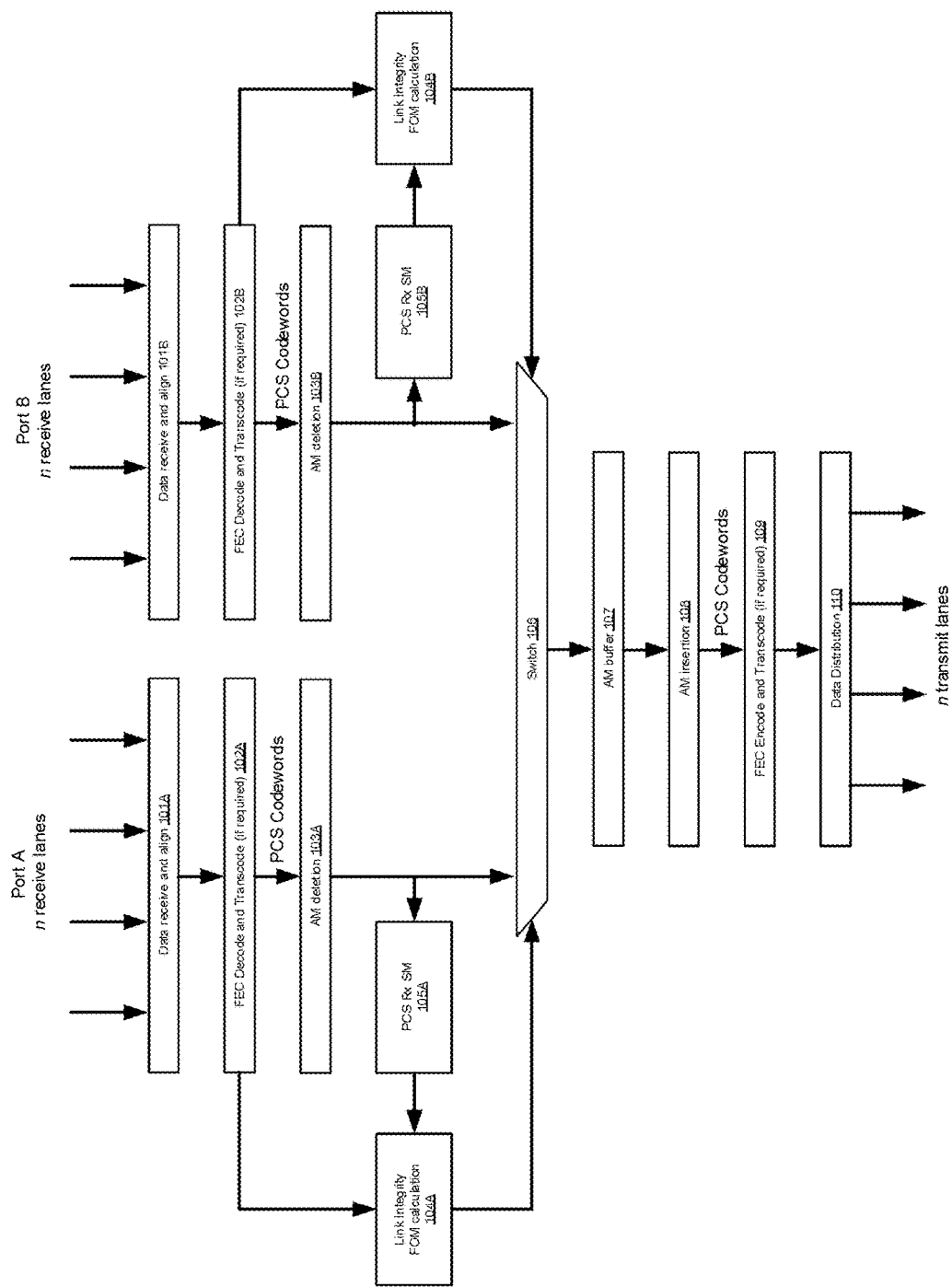
FIG. 1 is a simplified flow diagram illustrating processing incoming data received from two set of receiving lanes.

The present invention is directed to data communication systems and techniques thereof. In certain embodiments, the present invention provides switching mechanism for choosing between redundant communication links. Data received from a first set of communication links are processed to have alignment markers removed, and a first figure of merit value is determined based on the data without alignment markers. Similarly, a second figure of merit value is determined for the data received from the second set of communication links. A switch selects between the first set of communication links and the second set of communication links based on their respective figure of merit values. Alignment markers are inserted into the data transmitted through the selected set of data links. There are other embodiments as well.

In high-speed data communication applications, disruption of communication links can severely reduce data rate and system reliability. In addition to error correction mechanisms, having redundant communication links is an effective way to improve data rate and overall system reliability. For example, optical transport networks (OTN) employ automatic protection switching (APS) mechanisms to allow switching between redundant links to if one or more links fail. Ethernet networks can also benefit from redundant links, provided that the switching process does not significantly disrupt the overall data flow. It is particularly important that the switching process does not cause "loss-of-lock" in down-stream receivers, because a loss-of-lock event may require a complete link restart. For example, various types of high speed Ethernet rates use multi-lane links and/or FEC (Forward error Correction) encoding at the PCS layer, both of which are lock sensitive.

It is to be appreciated that embodiments of the present invention provide automatic switching between two or more redundant links at the PCS layer without causing loss of lock during switch-over processes. For example, communication systems with multi-lane links used in high speed Ethernet systems, such as IEEE P802.3ba (40/100G Ethernet), can readily benefit from the link switching mechanisms provided by embodiments of the present invention.

In multi-link data communication systems, an important step is multiplexing, where data from two or more data lanes are combined and then redistributed. During the process of combining and redistributing data, alignment markers (AM) are used. Among other things, AMs are used to remove static inter-lane skew and reconstruct the original order of data words. For example, AMs are inserted into the data streams sent on each lane to identify the lane and allow data to be re-aligned to remove any differential skews between lanes. In high-speed data communication applications, Reed-Solomon (RS) type FEC is often used. For example, recent Ethernet standard IEEE P802.3bj-2015 utilizes RS FEC. For example, a communication system performs RS FEC and uses AMs for lane identification and de-skew. Additionally, the system also uses AMs to identify FEC block boundaries. Disruption in the timing of AMs when switching between redundant links can degrade the data integrity of the outgoing data-streams for non-FEC multi-lane links, as data words and AMs would be interchanged, which can lead result in regular protocol errors at the new and old AM positions. The disruption is typically more catastrophic for FEC based links than non-FEC based links. If the FEC block boundary timing is changed, all of the FEC blocks would become un-correctable, which can lead to link breakdown. Link breakdowns are highly undesirable, because they require restarting the link.

It is thus to be appreciated that embodiments of the present invention overcome these problems by removing AMs from the re-constructed PCS word data-stream before the switch point, and then inserting new AMs after the switch point. The insertion point for the newly inserted AMs is determined by the switch device and kept consistent no matter which data source is selected.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

As explained above, utilizing redundant communication links is useful in ensuring system reliability. When switching from one set of communication links (e.g., with poor connection) to another, it is important to maintain data integrity and synchronization. In various embodiments of the present invention, AMs are removed and re-inserted when switching from one set of communication links to another. Removal and re-insertion of AMs involve buffering PCS data-words to prevent under-flows on removal or overflows on insertion. FIG. 1 is a simplified flow diagram illustrating processing incoming data received from two set of receiving lanes. This diagram is merely an example, which should not unduly limit the scope of the claims. One of ordinary skill in the art would recognize many variations, alternatives, and modifications. For example, one or more functional blocks may be added, removed, modified, replaced, rearranged, repeated, and/or overlapped, and should not limit the scope of the claims.

Data streams are received through data lanes. For example, data lanes can be wired connections, optical communication links, and/or other types of connections. A first set of n data lanes is coupled to at Port A as shown. A second set of n data lanes is coupled to Port B. As explained above, Port A and Port B, and their respective n data lanes, are configured as intentional redundancy to improve system reliability. More specifically, the first set of n data lanes and the second set of n data lanes are coupled to the same data source, and if one set of n data lanes suffers from connectivity issues, the system would automatic switch to the other set of n data lanes. In FIG. 1, n is four, but it is to be understood that n can be 2, 4, 8, 16, 32, or other numbers. For example, when n is four as shown in FIG. 1, the communication lanes can operate in various modes (e.g., a single lane with combined 200 Gbps data rate from four lanes or four individual 50 Gbps lanes). Data received from port A and port B are processed in parallel at their respective data paths until the switching function selects data from one of the data paths. For example, data received through Port A are processed at functional blocks 101A, 102A, 103A, 104A, and 105A, and data received through Port B are processed at 101B, 102B, 103B, 104B, and 105B. At process 106, either data path A or data path B is selected.

Data received, from each of the n lanes, through Port A are locked, buffered, and aligned at 101A. Similarly, Data received through Port B are locked, buffered, and aligned at 101B. Typically, FEC is used. For example, if the communication protocol uses FEC, at blocks 102A and 102B, respective the FEC frames are decoded and corrections are applied. Then data are transcoded back to the PCS codeword form (e.g., 64b66b coding). As explained above, to maintain lock on the received data, alignment markers are deleted from the codeword stream at blocks 103A and 103B.

The quality of received data without AMs is determined by at monitoring blocks 105A and 105B. More specifically, Rx SM blocks 105A and 105B monitor codeword streams for coding errors, and they respectively indicate errors to the link integrity FOM (Figure of Merit) calculation blocks 104A and 104B. Link integrity FOM calculation blocks are configured to determine quality and/or stat of the communication links. For example, link integrity FOM calculation blocks generate FOM values for data path A and data path B.

The switch block 106 switches between the codeword streams from the two ports based on their calculated FOMs. Depending on the data rate and system performance considerations, switching frequency at block 106 may be determined in various ways. For example, switch block 106 may switch from Port A to Port B if the FOM value of Port A drops below a threshold value. For example, number of uncorrectable FEC frames within a window of m frames are counted to see if they reach a predetermined limit n. If n is reached for a predetermined j consecutive windows, the FOM is declared bad; if n is not reached fork consecutive windows the FOM is declared good. In certain implementations, switch block 106 periodically obtains or receives FOM values from blocks 104A and 104B and selects between Port A and Port B accordingly.

Once a data path is selected, codewords are buffered at AM buffer 107 to allow for AM insertion and deletion. At block 108, alignment Markers are inserted into the codeword stream. If the communication protocol uses FEC, at block 109 data are transcoded into the FEC frame format, and FEC parity information is generated. At block 110, data are then distributed to the transmitting lanes.

Figure 2:
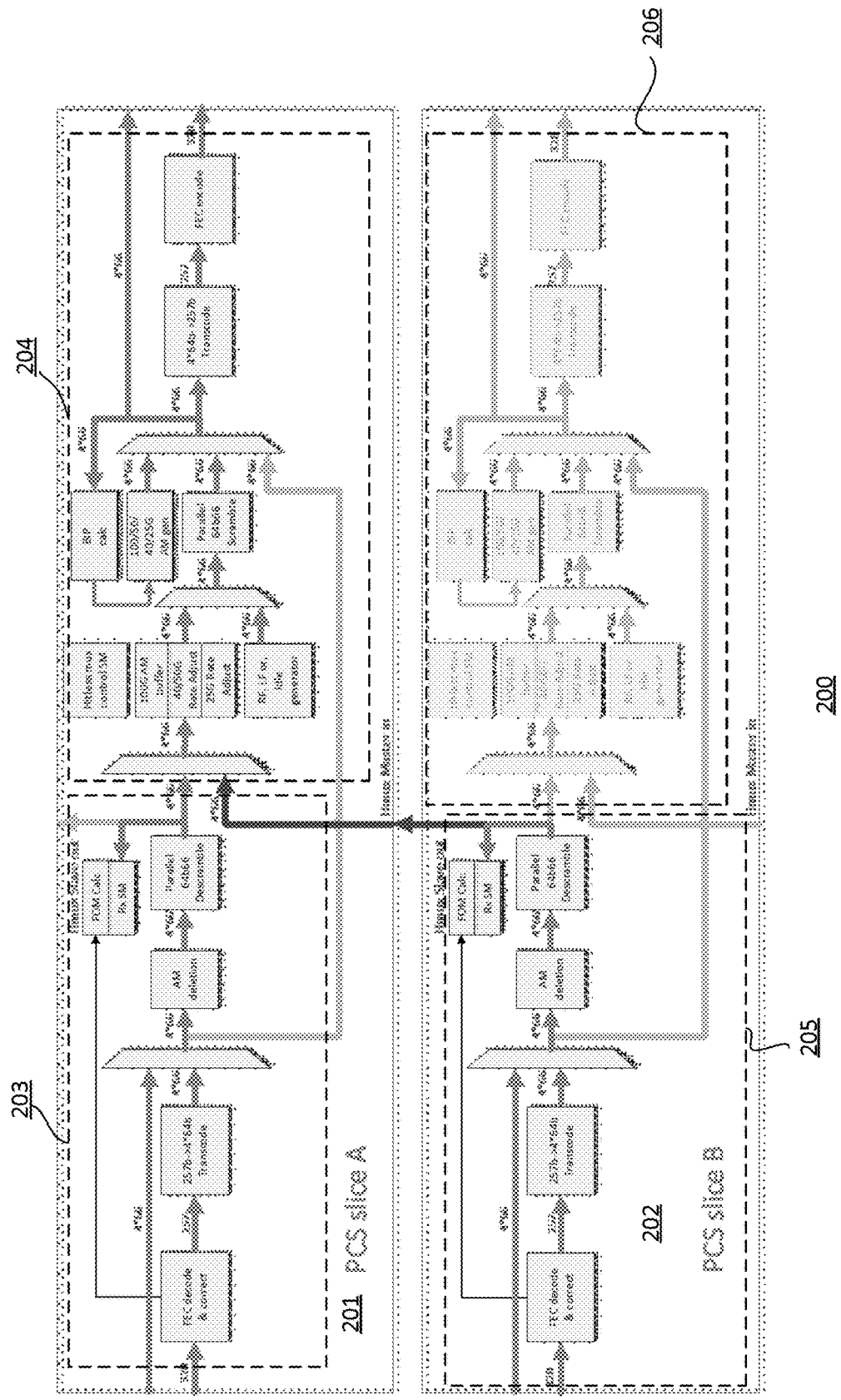
FIG. 2 is a simplified diagram illustrating communication system 200 according to an embodiment of the present invention.

FIG. 2 is a simplified diagram illustrating a communication system 200 according to an embodiment of the present invention. This diagram is merely an example, which should not unduly limit the scope of the claims. One of ordinary skill in the art would recognize many variations, alternatives, and modifications. More specifically, FIG. 2 illustrates a hit-less switching Ethernet system operating at a rate of 200 Gbps or less (e.g., 100 Gbps), and the switching mechanism is integrated with generalized per-lane PCS functions within a re-timer device.

As shown in FIG. 2, two communication paths are configured as two PCS slices (slice A 201 and slice B 202) that have the substantially the same components. In specific implementations, both slice A 201 and slice B 202 have switching hardware components, but switching is performed at the PCS A slide 201, and the switching components (region 206) at PCS B slice 202 are disabled. In operation, both PCS slices provide generalized PCS functions for single or multi-lane protocols up to 200 Gbps. These functions include FEC decoding and encoding, rate adjustment, and AM generation for conversion between protocols with and without AMs (or with different AM rates). For example, the communication system 200 in FIG. 2 is configured to perform operations illustrated in FIG. 1. More specifically, region 203 of PCS slice A 201 is configured to perform functions of blocks 101A-105A, and region 205 of PCS B 202 is configured to perform functions of blocks 101B-105B. Region 204 of PCS slice A 201 is configured to perform functions of blocks 106-110, and region 206 of slice B 202 is disabled (shown as greyed out).

As shown in FIG. 2, each slice has two input sources/formats: 320-bit wide aligned data for RS-FEC encoded Ethernet protocols, and 4*64b66b data for non RS-FEC protocols. RS-FEC encoded Ethernet protocols are decoded and corrected in the "FEC decode and correct" block, then transcoded into 4*64b66b codewords in the "257b→4*64b Transcode" block, thereby allowing all subsequent processes to operate on 4*64b66b codewords. For example, slice A 201 receives its data from Port A in FIG. 1, and slice B 202 from Port B.

In various implementations, the "AM deletion" blocks at both region 203 and region 205 remove rate selectable number of 4*64b66b codewords at a programmable AM repetition rate, starting from the first set of data received. For example, at data rate 200 Gbps or less, Ethernet applications use an AM sequence that is an integer number of 4*64b66b words (e.g., 1 for 25 & 50G, 5 for 100G).

The "Parallel 64b66b Descramble" blocks at both region 203 and region 205 remove scrambling from the 64b66b payload. At the outputs of these blocks, switchable PCS 64b66b codewords are available from slices A 201 and slice B 202. Slice B 202 sends data-stream from its "Parallel 64b66b Descramble" block" to slice A 201 so that the output of slice A 201 can be sourced from port A or port B. As explained above, the switching and output functions are performed at region 204 of slice A 201.

The "Rx SM" blocks at both region 203 and region 205 detect errors in the received data (e.g., "//E//" creation) as an input to the respective "FOM calc" blocks. For example, at 10G and 25G rates, the "Rx SM" blocks implement the Clause 49 PCS receive State diagram as specified according to the IEEE P802.3-2015 standard. For operating modes at 40G, 50G & 100G rates, the block operates according to the Clause 82 PCS receive State diagram specified under IEEE P802.3-2015.

Each of slices A 201 and slice B 202 includes a "FOM calc" block that determines the integrity (e.g., by calculating FOM values) of the attached port in order to decide when to switch between ports. The "FOM calc" blocks use error information from the Rx SM for non-FEC protocols, and error information from the FEC decoder for FEC based protocols. FOM calculations are described in further details below. Data and FOM information from slices B 202 are sent to slice A 201 for processing. More specifically, selection between inputs from slice A 201 and slice B 202 is performed by various components as region 204 of slice A 201. Further data processing in slice B 202 is disabled (i.e., region 206 is greyed out).

Figure 3:
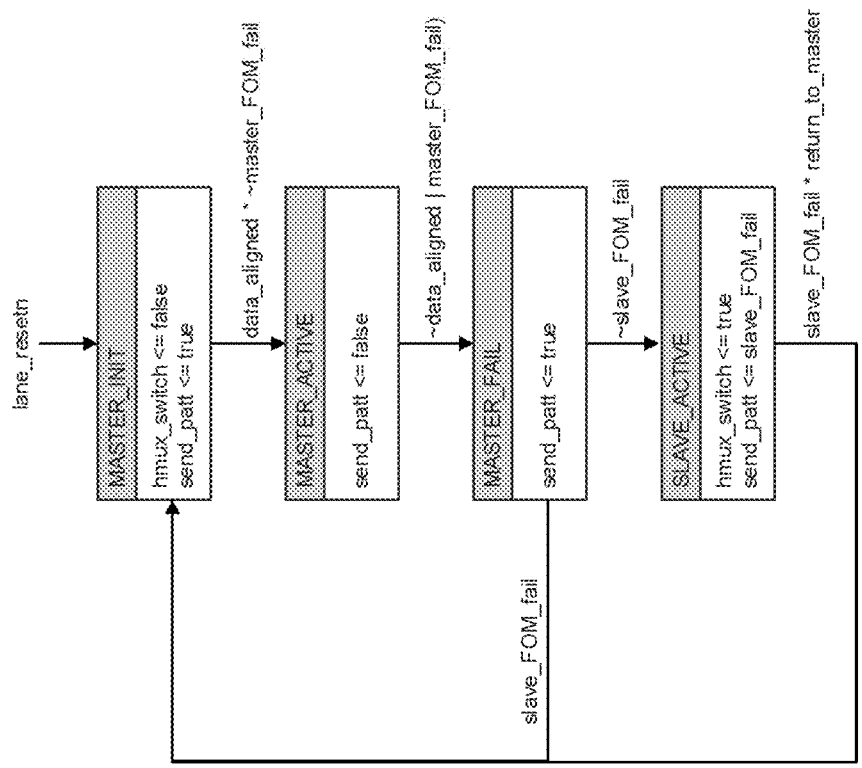
FIG. 3 is a simplified flow diagram illustrating operation of a hitless mux control state machine according to embodiments of the present invention.

Switching between the two input sources is initiated and controlled by the "Hitless mux control SM" block in slice A 201, using FOM information from both slices. FIG. 3 is a simplified flow diagram illustrating operation of a hitless mux control state machine according to embodiments of the present invention. This diagram is merely an example, which should not unduly limit the scope of the claims. One of ordinary skill in the art would recognize many variations, alternatives, and modifications. For example, various steps can be added, removed, modified, replaced, repeated, rearrange, and/or overlapped, and should not limit the scope of claims.

The state machine (SM) starts with the "lane_resetn" signal, which is an active low reset signal for lane. This signal is asserted on device reset, which is on (on a lane basis) via management data input/output (MDIO). For example, "lane_resetn" signal starts the SM when the device is first turned on or goes through a reset process. Once the SM is on, it operates in a loop as shown.

At the state "MASTER_INIT", the SM initiates and generates a signal "send_patt", which is used to for transmitting a fixed data pattern. For example, the data pattern is selectable from predetermined patterns "Idles", "Local Fault", and "Remote Fault". Absent of "send_patt" signal, the system transmits received data. Once the device is initiated, the SM enters the "MATER_ACTIVE" state. The "data_aligned" signal indicates that the data received at the master slice are aligned. It is asserted when all FECLs/PCSLs are aligned and unique.

The signal "master_FOM_fail" is related to the "Figure Of Merit" function for the master (local) data-streams. It indicates that an acceptable bit error rate (BER) is not being met. This signal is asserted at the end of a failing FOM measurement window.

The SM transfers to the "MASTER_FAIL" state if the FOM/BER drops below a predetermined threshold value, as indicated by the signal "master_FOM_fail". When that happens, the SM sends "send_patt" signal, which helps determine whether to switch to "slave" lanes. For example, for the purpose of SM operation, the term "master" refers to the data path slice A 201 in FIG. 2 and the term "slave" refers to data path on slice B 202. Based on the "slave_FOM_fail" signals, the SM goes to the "MASTER_INIT" state to re-initiate the state machine, or goes to the "SLAVE_ACTIVE" state to transfer data on the "slave" (or a second, i.e., slice B) data paths. More specifically, the "~slave_FOM_fail" signal indicates the slave link is aligned (e.g., all FECLs/PCSLs are aligned and unique), and an acceptable BER is being received. The "slave_FOM_fail" signal is asserted if slave loses link alignment or at the end of a failing FOM measurement window.

At the "SLAVE_ACTIVE" state, data are transfers through the "slave" (i.e., slice B in FIG. 2). The signal "hmux_switch" causes to the SM to switch data path. For example, when switching data path, a number of processes may be performed. The SM selects data and TX PLL reference clock source(s). When this signal is de-asserted (and "send_patt" is not asserted), the master (i.e., local or slice A) data path is active, and data received at Port A or slice A are transmitted. When this signal is asserted (and "send_patt" is not asserted), the slave (i.e., remote or Slice B) data path is active, and data received at Port B or slice B are transmitted. The signal "return_to_master" is used a configuration bit. If signal "return_to_mater" is asserted, a slave FOM failure causes a switch back to the master link. If the signal is de-asserted (default), no switch back occurs. The selected fill pattern is to be transmitted when the slave FOM fails.

It is to be noted that according to the SM illustrated in FIG. 3, switching of data path is triggered when an active data path experiences a drop in performance (i.e., master or slave FOM failure). As explained above, the switching of data path can be triggered in other ways, such as periodic determination of performance of data paths, and the data path with better performance measurements is selected.

Now referring back to FIG. 2. The unscrambled, "64b66b" data-stream (without AMs) from the selected data path (i.e., slice A 201 or slice B 202) is passed to the "AM/rate adjust" buffers. For example, these buffers are implemented as first-in-first-out (FIFO) buffers. These FIFO buffers prevent data underflows and overflows when AMs are deleted or inserted. In various operations, the output of the buffers can be replaced with a known PCS pattern (e.g., Idles, Remote Fault, or Local Fault used in SM in FIG. 3) for pattern generation, or as a fill pattern when the "AM/rate adjust" buffers undergo re-centering process when switching-over from one data path to the other.

The data-stream payload, as shown, is then re-scrambled by the "Parallel 64b66b Scramble" block. The "100/50/40/25G AM gen" block generates the specified AM sequences for the required protocol in conjunction with the "BIP calc" block. The "BIP calc" block calculates the "AM Bit Interleaved" parity fields used in 40 and 100G Ethernet protocols. The AMs generated by the "100/50/40/25G AM gen" block are inserted into the 4*64b66b codeword stream, which is ready for lane distribution for non-FEC protocols. In various embodiments, RS-FEC based protocols convert the 4*64b66b codeword stream into 256b257 words in the "4*64b→$_{257}$b Transcode" block before calculating and adding FEC parity in the "FEC Encode" block.

To evaluate the data path that is to be used, FOM values are used as a metric in various embodiments of the present invention. For example, in RS-FEC based protocols, two FOM methods are supported:

Uncorrectable FEC frame based FOM (default); and
FEC frame symbol error based FOM The default RS-FEC FOM method is the uncorrectable FEC frame based FOM. This FOM calculation method is based on the reception rate of un-correctable FEC frames. The number of uncorrectable FEC frames within a window of m frames are counted to see if they reach a predetermined limit n. If n is reached for a predetermined j consecutive windows, the FOM is declared bad; if n is not reached fork consecutive windows the FOM is declared good. In various embodiments, the window size is configured by a 4-bit register field "mm". The window period in FEC frames is defined by $m=2\wedge(mm+1)$, the window expires if the predetermined limit is reached. The limit is configured by a 2-bit register field "nn". The predetermined limit of un-correctable FEC frames in a window is defined by $n=2\wedge(nn+1)$. The number of consecutive window failures required to declare FOM bad is configured by a 3-bit register field "jj". The number of consecutive windows is defined by $j=2\wedge(jj)$. The number of consecutive window passes required to declare FOM good is configured by a 3-bit register field "kk". The number of consecutive windows is defined by $k=2\wedge(kk)$.

The second FOM calculation method is FEC frame symbol error based FOM. In this method, the FOM value is based on the reception rate of symbol errors. For example, the symbol error based FOM method has certain advantage over the uncorrectable FEC Frame FOM, in that it can be set to trigger at a level lower than the level that causes data corruption. In various embodiments, the FOM calculation uses the "hi_ser" status from the FEC decoder to determine if there has been a reduction in data quality (e.g., as measured in the increased error rate). A positive "hi_ser" status indicates that the FOM is bad; a negative "hi_ser" status indicates that the FOM is good. In various embodiments, a positive "hi_ser" status is asserted if a predetermined K number of symbol errors are detected in a specified L number of consecutive non-overlapping FEC codewords. For the purposes of the P802.3 where the "hi_ser" status bit is used, L is 8192 codewords and K is 417 symbols for RS528, or 6380 symbols for RS544 FECs. For hit-less multiplexer applications, both K and L are programmable registers for 16-bit values. For example, variables "FPTL_FPS_SER_INTERVAL" and "FPTL_FPS_SER_THRESHOLD" are provided per PCS slice to hold L and K values respectively.

For non-RS-FEC based protocols, the FOM is based on the error rate of 64b66b words. The number of 64b66b words with coding errors within a window of m 64b66b words are counted to see if they reach a predetermined limit n. If n is reached for j consecutive windows, the FOM is declared bad; if n is not reached fork consecutive windows, the FOM is declared good. The window is configured by a 4-bit register field "mm". The window period in 64b66b words is defined by $m=2(mm+1)$, and the window also expires if the limit is reached. The limit is configured by a 3-bit register field "nn". The limit of errored 64b66b words in a window is $n=2(nn+1)$. The number of consecutive window failures required to declare FOM bad is configured by a 3-bit register field "jj". The number of consecutive windows is $j=2(jj)$. The number of consecutive window passes required to declare FOM good is configured by a 3-bit register field "kk". The number of consecutive windows $k=2(kk)$.

It is to be appreciated that depending on the implementation, other FOM calculation methods and/or other metrics can be used as basis for selecting data path as well.

Figure 4:
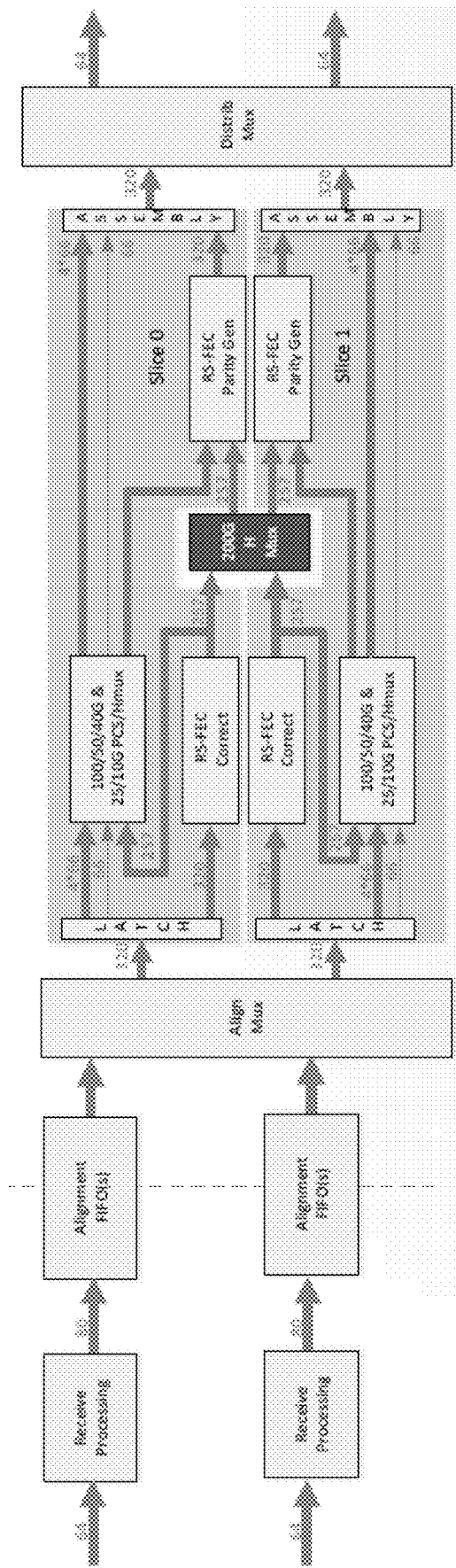
FIG. 4 is a simplified diagram illustrating a communication system according to embodiments of the present invention.

FIG. 4 is a simplified diagram illustrating a communication system according to embodiments of the present invention. This diagram is merely an example, which should not unduly limit the scope of the claims. One of ordinary skill in the art would recognize many variations, alternatives, and modifications. For example, the communication system is implemented as a part of a serializer/deserializer (SerDes) system, where the system receives data from and output data to SerDes devices. In FIG. 4, two separate data paths are configured to transmit data. One of the data paths functions as the primary data lane, and other data path functions as a backup data path.

Figure 5:
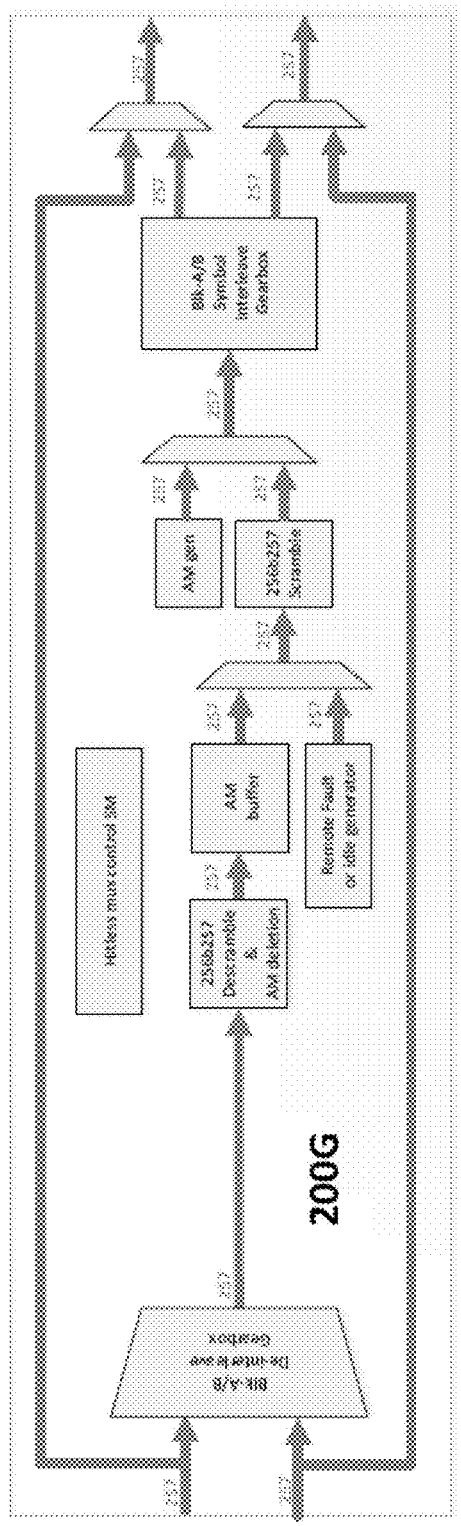
FIG. 5 is a simplified diagram illustrating a hitless multiplexer according to embodiments of the present invention.

FIG. 5 is a simplified diagram illustrating a hitless multiplexer according to embodiments of the present invention. This diagram is merely an example, which should not unduly limit the scope of the claims. One of ordinary skill in the art would recognize many variations, alternatives, and modifications. A distribution multiplexer is configured to switch between "normal" and "redundant" input data sources. In operation, a set of valid 200G Idle or Remote-Fault data is generated locally while switch-over occurs. AMs and FEC blocks are generated locally, which is to ensure that FEC boundary and AM location do not change on switch-over. Input data are received by reconstructing 200G 256b257 word streams from the 2 interleaved FEC blocks. The received input data are descrambled and AMs are removed. The multiplexer generates "fill" data for switchover. Once switchover is finished, new AMs are generated and data are scrambled. Data are transmitted as a 200G 256b257 word stream distributed into 2 interleaved FEC block streams.

Figure 6:
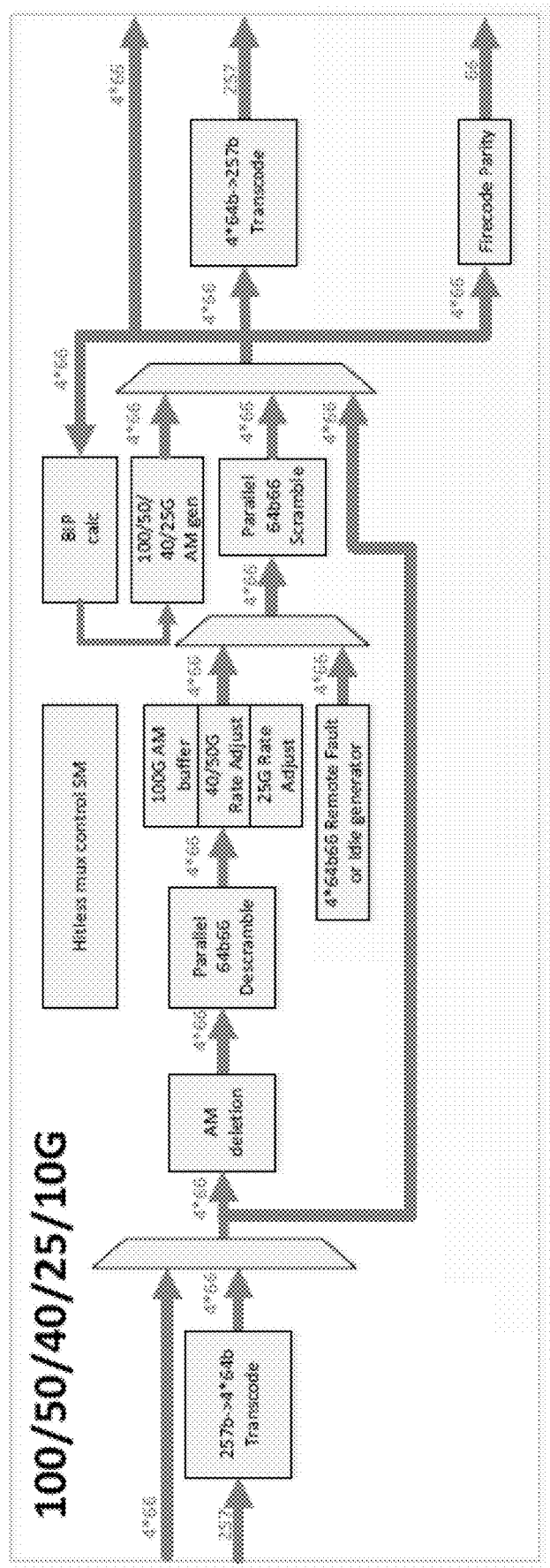
FIG. 6 is a simplified diagram illustrating a PCS hitless multiplexer according to embodiments of the present invention.

FIG. 6 is a simplified diagram illustrating a PCS hitless multiplexer according to embodiments of the present invention. This diagram is merely an example, which should not unduly limit the scope of the claims. One of ordinary skill in the art would recognize many variations, alternatives, and modifications. A distribution multiplexer is configured to switch between "normal" and "redundant" input data sources. Transcoding from 256b257 to 4*64b66 is performed when the data are received, and the transcoding process can be bypassed. The received input data are descrambled and AMs are removed. For data transferring with 25/50/100G Ethernet, data rate adjustment and/or AM buffering are performed. Fill data are generated for the multiplexer switchover process, if data transfer needs to switch from one set of data paths to another. New AMs are then generated (with bit interface parity if need), and data are scrambled. Depending on the data transfer, data may be transcoded from 4*64b66 to 256b257. Additionally, optional FireCodeParity may be generated and encoded into the data stream. There can be other variations as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A communication device comprising:
   a first multiplexer block for generating a first data stream from a first data source and a second data source, the second data source comprising transcoded data;
   an alignment marker (AM) deletion block for removing alignment markers from the first data stream;
   a first data processing block for generating a second data stream by de-scrambling the first data stream with the alignment markers removed;
   a second data processing block for adjusting a data rate associated with the second data stream;
   a data generation block for generating a third data stream;
   a second multiplexer configured to generate a fourth data stream by selecting between the second data stream and the third data stream;
   a third data processing block for generating a fifth data stream by scrambling the fourth data stream;
   an alignment generator configured to generate alignment markers for the fifth data stream; and
   a third multiplexer for generating a sixth data stream by multiplexing the alignment markers and the fifth data stream.

2. The device of claim 1 further comprising a transcoding block for transcoding the sixth data stream.

3. The device of claim 1 wherein the data generation block comprises an idle data block generator.

4. The device of claim 1 wherein the data generation block comprises a remote fault generator.

5. The device of claim 1 where the third multiplexer is further configured to multiplex the second data stream.

6. The device of claim 1 wherein the second data processing block comprises an AM buffer.

7. The device of claim 6 further comprising a bit-interleaved parity calculation block coupled to the alignment generator.

8. The device of claim 7 wherein the bit-interleaved parity calculation block is coupled to a fire code parity block.

9. A method for data communication, the method comprising:
   selecting between a first data stream and a second data stream to generate a third data stream, the first data stream comprises transcoded data;
   removing alignment markers from the third data stream;
   generating a fourth data stream by de-scrambling the third data stream;
   adjusting a rate associated with the fourth data stream;
   generating a fifth data stream;
   multiplexing between the fourth data stream and the fifth data stream to generate a sixth data stream; and
   scrambling the sixth data stream to generate a seventh data stream.

10. The method of claim 9 further comprising generating alignment markers for the seventh data stream.

11. The method of claim 9 further comprising multiplexing the alignment markers and the seventh data stream.

12. The method of claim 9 further comprising performing bit-interleaved parity calculation.

13. The method of claim 12 further comprising updating alignment markers using the bit-interleaved parity calculation.

14. The method of claim 9 wherein the fifth data stream comprises locally generated data.

15. The method of claim 9 wherein the fifth data stream comprises remote fault data.

16. The method of claim 9 further comprising storing a portion of the fourth data stream in a buffer.

17. The method of claim 9 further comprising determining a fire code parity.

18. A method for operating a SerDes system comprising:
   an alignment buffer for storing a first data stream received from first plurality of data lanes at an alignment buffer by a first SerDes device;
   removing AMs from the first data stream to generate a first codeword stream;
   determining a first coding error amount associated with the first codeword stream;
   calculating a first figure of merit (FOM) value based the first coding error amount and/or output from a first forward error correction (FEC) module;

calculating a second FOM value associated with a second codeword stream; and generating a third data stream by selecting between the first codeword stream and the second codeword stream based at least on a threshold value for the first FOM value and the second FOM value.

19. The method of claim 18 further comprising processing the third data stream by a second SerDes device.

* * * * *